US008294573B2

(12) United States Patent  
Mermet et al.

(10) Patent No.: US 8,294,573 B2
(45) Date of Patent: Oct. 23, 2012

(54) SYSTEM AND METHOD FOR OPTIMIZING POWER CONSUMPTION OF CONTAINER TRACKING DEVICES THROUGH MESH NETWORKS

(75) Inventors: Jean-Francois Mermet, Tourrettes sur Loup (FR); Bernard Pucci, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 12/359,704

(22) Filed: Jan. 26, 2009

(65) Prior Publication Data

US 2010/0149028 A1 Jun. 17, 2010

(30) Foreign Application Priority Data

Dec. 11, 2008 (EP) .................................. 08305921

(51) Int. Cl.
*G08B 1/08* (2006.01)
(52) U.S. Cl. ..................................................... 340/539.3

(58) Field of Classification Search ............... 340/568.1, 340/571.1, 3.1, 5.92, 825.35, 825.49, 988, 340/539.3; 455/419
See application file for complete search history.

(56) References Cited

U.S. PATENT DOCUMENTS

| 5,565,858 | A  | * | 10/1996 | Guthrie ..................... 340/10.33 |
| 6,281,797 | B1 |   | 8/2001  | Forster et al. |
| 6,636,158 | B1 | * | 10/2003 | Bando et al. .................. 340/8.1 |
| 6,972,682 | B2 | * | 12/2005 | Lareau et al. ............... 340/568.1 |
| 6,996,215 | B2 | * | 2/2006  | MacConnell ............ 379/106.03 |
| 7,027,808 | B2 | * | 4/2006  | Wesby ......................... 455/419 |
| 7,468,927 | B1 | * | 12/2008 | Battista ......................... 365/226 |
| 7,564,352 | B2 | * | 7/2009  | Ekstrom ..................... 340/545.6 |
| 2009/0096604 | A1 | * | 4/2009 | Battista ....................... 340/539.3 |

* cited by examiner

*Primary Examiner* — Jennifer Mehmood
*Assistant Examiner* — Kaleria Knox
(74) *Attorney, Agent, or Firm* — Scully, Scott, Murphy & Presser, P.C.; Jean Sullivan

(57) ABSTRACT

A system of tracking transcontinental shipping containers, which is optimized to conserve the power consumption of tracking devices attached to the containers, is disclosed. The system uses short-range transceiving devices to form a mesh network that includes the tracking devices and a processing device coupled to the shipping vessel, thereby enabling the tracking devices to communicate and update their status without using a long-range or satellite communications adaptors.

7 Claims, 3 Drawing Sheets

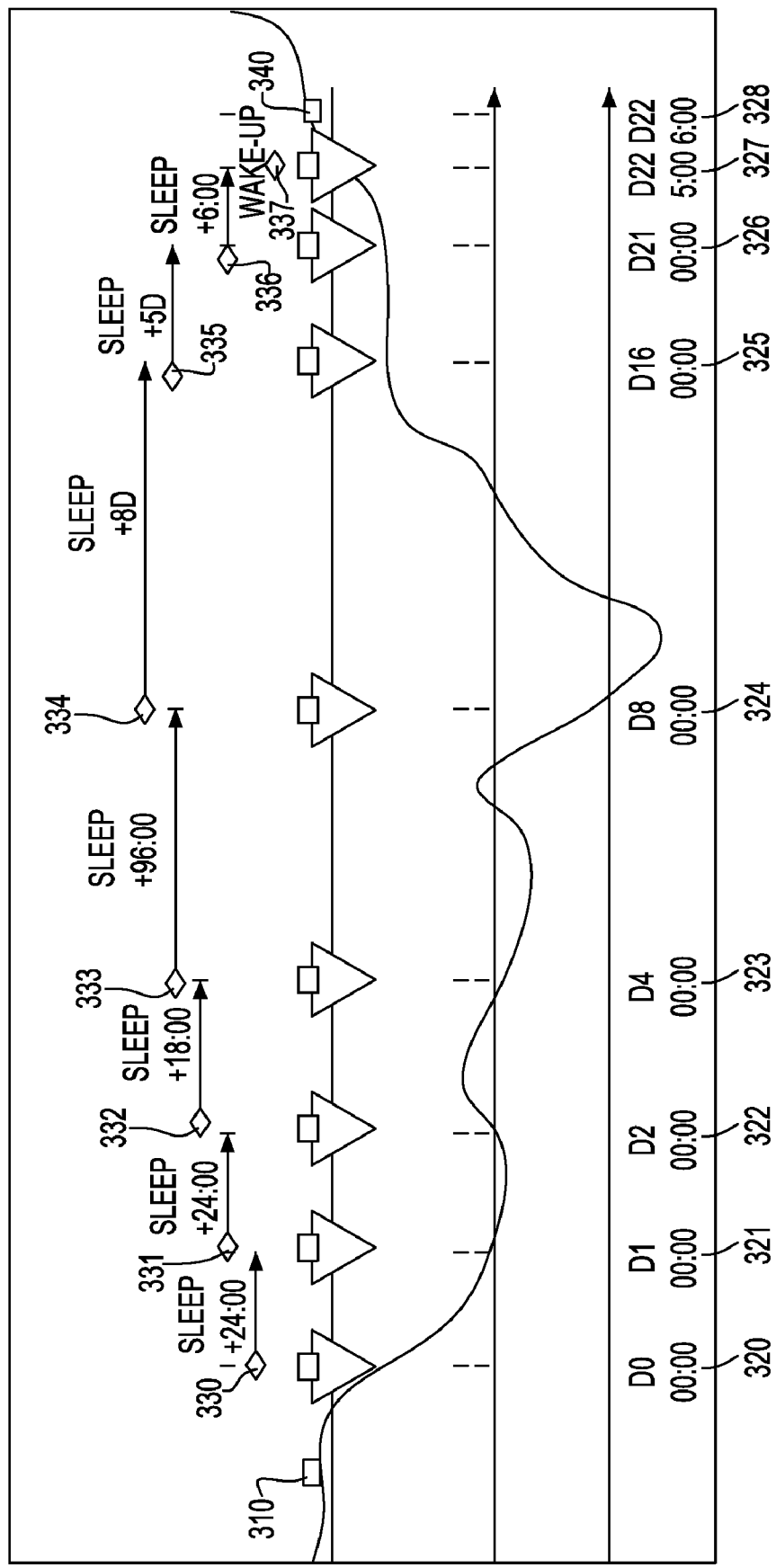

US 8,294,573 B2

SYSTEM AND METHOD FOR OPTIMIZING POWER CONSUMPTION OF CONTAINER TRACKING DEVICES THROUGH MESH NETWORKS

FIELD OF THE INVENTION

The invention relates generally to a field of tracking transcontinental cargo transported in containers; and more specifically, the invention relates to a method for optimizing the power consumption of container tracking devices by using a mesh network.

BACKGROUND OF THE INVENTION

It is known in the relevant art that transoceanic shipping containers and other devices used to transport goods (hereinafter, "containers") can be equipped with tracking devices to track movement of the container through distribution channels and to monitor various operating conditions of the container during transportation. Additionally, these tracking devices are equipped with various sensors to gather information about the operating conditions of the container and include wireless transmitters to communicate the gathered information with a backend system. The backend system conventionally is an industrial class computer (or "server") residing in a stationary position and its location is usually terrestrial. As a consequence, the backend server is not in transit with the container. Examples of information communicated by tracking devices to the backend system include: reporting notable events (e.g. loading and unloading the container), alarms regarding certain conditions that have occurred (e.g. server temperature fluctuations) or reporting a current position. The communication channels typically used by the tracking devices to communicate with the backend system are based on wireless technologies that facilitate long-range communications, e.g. where the effective communication range is measured in kilometers. Examples of such long-range communication methods include Global System for Mobile communication protocol ("GSM"), wide area network protocols ("WAN"), and protocols based in the International Telecommunication Union IMT-2000 standard ("3G"). Additionally, tracking devices may use satellite technologies to communicate with the backend system.

Power management is a significant challenge when designing a tracking device, because these devices lack an external power source. It is well known in the relevant art that a major contributor to power consumption includes any power requirements needed for operating a satellite navigation system transceiver device (e.g., transceivers capable of communicating with the Global Positioning System, or "GPS" transceivers) used in the detection of signals for determining a containers geographical location and in the wireless transmission of position information. For various reasons, when the tracking device is on-board a transoceanic shipping vessel, the tracking device is sometimes unable to detect a GPS signal or communicate with the backend system via long-range communication mechanisms due to interference (e.g. the structure of a shipping vessel, and placement of the containers therein, causes interference such that the transceivers of each tracking device are unable to properly transmit or receive over long distances). Consequently, those functions are usually disabled to save power and enabled when the container is unloaded from the vessel.

To automate saving power by disabling the GPS subsystem, tracking devices will disable the communication channel based on passage through "geofences" (e.g. a loading or unloading zone) during transport to a predetermined destination and according to a predetermined ocean trip duration. Both the ocean trip duration and the geofences, and hence when the tracking device will disable its communications channel, are configured prior to loading time.

As a consequence, the current system is rigid because the ocean trip duration must be estimated when the trip is scheduled and cannot be modified during transit. For example, the tracking devices will not be reconfigured when the vessel's transoceanic route is modified. Since the tracking devices will remain asleep during an unscheduled trans-shipment modification, important tracking data is lost. This rigidity in the current system is considered a major drawback of the power saving process.

It would be desirable to provide a method for optimizing the power consumption of tracking devices coupled to containers aboard these transoceanic shipping vessels, while accommodating unexpected changes to the shipping route.

SUMMARY OF THE INVENTION

To overcome the issues described above, the present invention employs a mesh network that utilizes short-range transceivers, where the effective communication range is measured in meters. The short-range transceivers are attached to tracking device to receive a signal representing a sleeping mode duration based on the detected position of the shipping vessel. The frequency of these signals is configurable via a central server located on the shipping vessel or via the backend server. Moreover, transmission of the sleep mode duration does not necessarily occur at the origin of the shipment. During the sleep mode duration, all wireless communication is disabled to conserve power.

After the sleep mode duration, the short range-adaptors are enabled for a short period of time to receive information from a backend system via a server installed in the shipping vessel, hereinafter referred to as the "Edge" server. The backend system and the Edge server communicate via traditional long-range communication methods. The sleep mode duration period is adjusted based on the position of the vessel (e.g. shorter durations near the coasts, longer durations while traversing the ocean). As the transoceanic vessel approaches its destination, the backend system can inform the Edge server when the tracking devices must wake-up to restart the WAN channels and GPS system. Moreover, if the vessel alters it scheduled destination (e.g., due to damaged incurred while in transit), or the captain or the backend server is able to adjust the wake-up time corresponding to the new destination.

Thus, in accordance with one aspect of the invention, there is provided a system for monitoring containers, logically coupled to respective tracking devices, transported in a transport vessel from a geographically located source location to a geographically located destination location, comprising:

a mesh network located on said transport vessel, formed at a predetermined time from a plurality of first short-range transceiving devices, each coupled to a respective tracking device;

a satellite navigation system receiver located on said transport vessel and obtaining location information of said transport vessel; and a processing device, coupled to said transport vessel and said satellite navigation system receiver, said processing device including a second short-range radio transceiving device adapted to communicate with said mesh network via at least one of the first short-range radio transceiving devices, said processing device transmitting a sleep mode duration message, based on said obtained geographic location of said transport vessel and including a sleep mode duration command, to disable said mesh network according to the transmitted sleep mode duration.

Furthermore, according to another aspect of the invention, there is a method for conserving power in a tracking device coupled to a container on a transport vessel, comprising:

building, at a predetermined time, a mesh communications network including said tracking device and other tracking devices coupled to other containers stored in said transport vessel, within range of a short-range communications transceiver coupled to the tracking device;

receiving, through the mesh communications network, a command from a processing device, fixedly coupled to said transport vessel, where the command includes at least one of a sleep command and a wake command;

disabling the short-range communications transceiver and all wireless communication modules coupled to the tracking device upon receiving the sleep command, where the sleep command includes a wake-up time; otherwise enabling operation of all wireless communication modules coupled to the tracking device.

BRIEF DESCRIPTION OF THE DRAWINGS

The novel features believed characteristic of the invention are set forth in the appended claims. The invention itself however, as well as a preferred mode of use, further objects and advantages thereof will best be understood by reference to the following detailed description of an illustrative embodiment when read in conjunction with the accompanying drawings. In each of the drawings below, as well as the respective descriptions, the same numbers are used throughout to reference like components and/or features.

FIG. 3 is a schematic diagram illustrating a sleep cycle according to one embodiment of the present invention.

DETAILED DESCRIPTION OF THE INVENTION

A method and system for optimizing the power consumption of container tracking devices through mesh networks are provided. More specifically, the disclosed method and system each conserve power of individual tracking devices by disabling wireless communications, but retain limited wireless communications by enabling low-power, short-range wireless communications devices for short periods to receive updates and transmit sensory information to external devices.

Figure 1:
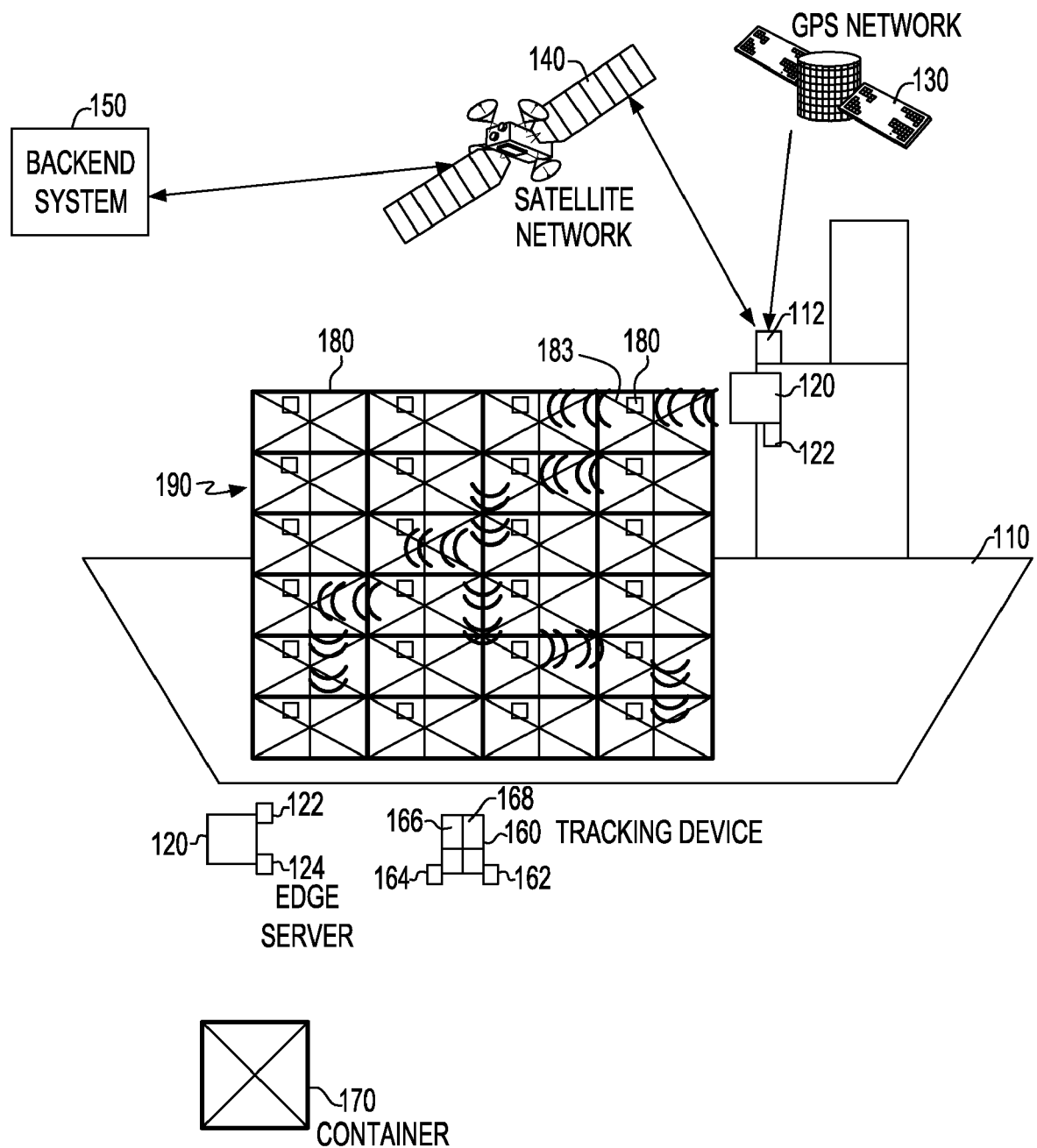
FIG. 1 is a schematic diagram illustrating one embodiment of the present invention.

FIG. 1 illustrates a transport device, such as a shipping vessel 110, transporting cargo 180, that may include a plurality of containers 170, and equipped with a processing device, hereinafter referred to as Edge server 120. Edge server 120 is an industrial class server or like computer device and communicates with back-end system 150 via satellite network communications 140. Back-end system 150 is in a remote location that is geographically distinguishable from the location of shipping vessel 110. Preferably, back-end system 150 is in a stationary location, such as a terrestrial data center used to track numerous transport devices around the globe.

In the embodiment shown in FIG. 1, mesh network 190 is shown in cargo 180 and is based on the Institute of Electrical and Electronics Engineers (IEEE) 802.15 standard, also known as the Zigbee communications protocol (IEEE Std 802.15-2006, incorporated by reference). Mesh network 190 includes every tracking device 160 attached to a respective container 170 in cargo 180 and each tracking device 160 includes a Zigbee adaptor 162 to enable communications with nearby devices via the Zigbee protocol. In addition, Edge server 120 includes Zigbee adapter 124 and is able to communicate with tracking device 182, included in cargo 180 and also includes Zigbee adaptor 183. Consequently, mesh network 190 includes every tracking device 160 in cargo 180, as well as the Edge server 120 Edge server 120 is configured to communicate with GPS Network 130, and particularly through GPS Receiver 112 located on shipping vessel 110. By communicating with both GPS Network 130 and satellite network 140, Edge server 120 is able to provide backend system 150 with a geographical position of shipping vessel 110.

In addition, FIG. 1 shows Edge server 120 coupled to power coupler 122. Power coupler 122 is coupled to an external power source to supply Edge server 120 with constant and reliable power throughout the lifespan of Edge server 120. In the embodiment shown in FIG. 1, Edge server 120 is coupled to shipping vessel 110 via power coupler 122.

As previously mentioned, tracking device 160 includes Zigbee adaptor 162 and further includes persistent memory 168. Persistent memory 168 is used, inter alia, to store a Universal Time Coordinated time ("UTC") received, e.g., via Zigbee adaptor 162. Optionally, each tracking device 160 also includes a GPS receiver 164 for receiving GPS signals suitable for obtaining a geographical location fix, and long-range wireless adaptor 166 for satellite based communication with backend system 150. It is understood by those skilled in the art that GPS receiver 164 provides tracking device 160 with UTC time information in addition to providing geographic position information. Consequently, persistent memory 168 may also store a UTC time received from GPS receiver 164.

Figure 2:
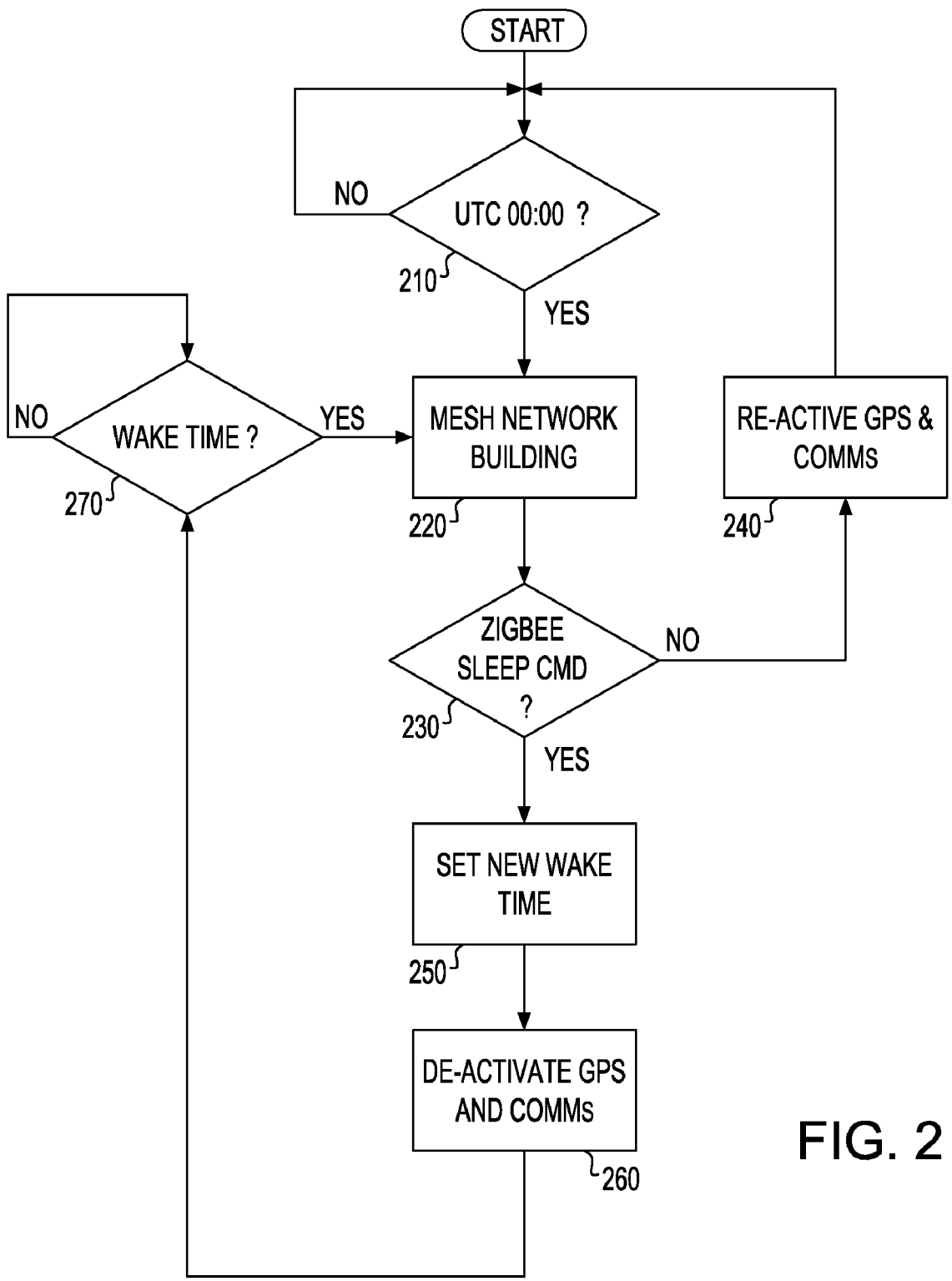
FIG. 2 is flowchart illustrating a method according to another embodiment of the present invention.

FIG. 2 illustrates a method according to one embodiment of the present invention that is performed by each tracking device 160 to gather information and communicate with Edge server 120. In step 210, once loaded onto shipping vessel 110 (an event determined by various means, examples of which are known in the relevant art; e.g., receiving a command indicating that tracking device 160 has been loaded onto a shipping vessel), each tracking device 160 in cargo 180 is programmed to enable their respective Zigbee adapter 162 at a fixed UTC time. In the embodiment shown in FIG. 2, the UTC time is 00:00. Those skilled in the art, however, would recognize other predetermined UTC values are possible. In step 220, mesh network 190 is built when each tracking device 160 in cargo 180 enables their respective Zigbee adapters. Building a mesh network is a component of the Zigbee protocol, and therefore is known to those skilled in the art. In addition, since tracking device 182 is within range of Zigbee adaptor 124 on Edge server 120, mesh network 190 also includes Edge server 120.

After the tracking devices in cargo 180 and Edge server 120 negotiate a mesh network amongst themselves in step 220, Edge Server 120 optionally sends each tracking device 160 a sleep command in step 230. If Edge server 120 does not send a sleep command, each tracking device 160 may enable GPS receiver 164 and long-range adaptor 166 in step 240. When Edge server 120 sends each tracking device 160 a sleep command, Edge server 120 will also send each tracking device 160 in cargo 180 a "wake-up time" to enable their respective Zigbee adaptors, as shown in step 250. In one embodiment, the wake-up time is set according to UTC time. In step 260, each tracking device 160 disables all wireless communication functions.

In step 270, each tracking device 160 detects whether the wake-up time has occurred. This process may occur, for example, when each tracking device 160 checks an internal clock set to UTC time. Once tracking device 160 detects the wake-up time, the process returns to step 220.

In addition to the communications described in FIG. 2, overriding the sleep cycle frequency, i.e. the process of waking up the tracking devices and setting the next sleep duration, is also possible. An example sleep cycle frequency is illustrated in FIG. 3, where port 310 is where shipping vessel 110 departs and port 340 is shipping vessel 110 destination. UTC times 320 to 328 are times at which each tracking device 160 have been scheduled to wake-up according to transmission received from Edge server 120. Specifically, sleep commands 330 to 336 and wake-up command 337 are transmitted to each tracking device 160 on-board shipping vessel 110 at corresponding UTC times 320 to 327, in accordance with the algorithm described in FIG. 2. Thus, the sleep cycle includes the combination of a UTC time and sleep command, and the sleep time frequency describes how often the cycle is repeated during a voyage. In addition, as shown in FIG. 3, the sleep cycle frequency is dynamic and may be adjusted based on shipping vessel 110 oceanic position or other, external, factors. For example, backend system 150, which is aware of the GPS position of shipping vessel 110 and the next destination harbor of shipping vessel 110, is able to estimate the remaining trip duration for shipping vessel 11(3 and calculate an optimal sleep cycle frequency. Consequently, back-end system 150 may determine that more wake-up times are necessary and override the next wake-up time for each tracking device 160 corresponding to shipping vessel 110. Then, via satellite network 140, backend system 150 communicates this information to Edge server 120, and thereby sets a new sleep cycle frequency. Moreover, through a simple User Interface provided by Edge server 120, an officer or crew member of shipping vessel 110 may also program the next wake-up time dynamically, overriding the next wake-up time as estimated by backend system 150, and thereby setting a new sleep cycle frequency.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A system for monitoring containers, logically coupled to respective tracking devices, transported in a transport vessel from a geographically located source location to a geographically located destination location, comprising:

a mesh network located on said transport vessel, formed at a predetermined time from a plurality of first short-range transceiving devices, each coupled to a respective tracking device;

a satellite navigation system receiver located on said transport vessel and obtaining location information of said transport vessel;

a processing device, coupled to said transport vessel and said satellite navigation system receiver, said processing device including a second short-range radio transceiving device adapted to communicate with said mesh network via at least one of the first short-range radio transceiving devices, said processing device transmitting a sleep mode duration message, based on said obtained geographic location of said transport vessel and including a sleep mode duration command, to disable said mesh network according to the transmitted sleep mode duration; and a user interface disposed on the transport vessel, wherein the user interface is in operative communication with said processing device and wherein the user interface is configured to set a sleep mode duration to be transmitted by said processing device.

2. The system according to claim 1, wherein the tracking devices include a persistent memory, and wherein said processing device transmits to the tracking devices a first universal time according said satellite navigation system receiver, the tracking devices store the first universal time in the persistent memory and the predetermined time is according to a second universal time.

3. The system according to claim 2, wherein the first universal time and second universal time operate according to Universal Time Coordinated time.

4. The system according to claim 1, wherein the tracking devices each include a second satellite navigation system receiver and a long-range communications transceiving device, respectively, and wherein the tracking devices disable their respective second satellite navigation system receivers and long-range communications transceiving devices when said transport vessel departs from said source location, and wherein the tracking devices enable their respective second satellite navigation system receivers and long-range communications transceiving devices when said transport vessel arrives at said destination location.

5. The system according to claim 4, wherein said processing device is coupled to a satellite transceiving device, and wherein transmitting the sleep mode duration message is further based on a received sleep mode duration message, which includes a received sleep mode duration command and has been received by said processing device via said satellite transceiving device.

6. A method for conserving power in a tracking device coupled to a container on a transport vessel, comprising:

building, at a predetermined time, a mesh communications network including said tracking device and other tracking devices coupled to other containers stored in said transport vessel, within range of a short-range communications transceiver coupled to the tracking device;

obtaining, from a satellite navigation system receiver located on said transport vessel, location information of said transport vessel;

receiving, through the mesh communications network, a command, based on said obtained geographic location of said transport vessel, from a processing device, fixedly coupled to said transport vessel, where the command includes at least a sleep command disabling the short-range communications transceiver and all wireless communication modules coupled to the tracking device upon receiving the sleep command, where the sleep command includes a wake-up time; and receiving from a user interface disposed on the transport vessel, wherein the user interface is in operative communication with said processing device, a sleep mode duration to be transmitted by said processing device.

7. The method according to claim 6, wherein the predetermined time and wake-up time are set according to a Universal Time Coordinated timebase.

* * * * *